(12) United States Patent
Chavez et al.

(10) Patent No.: US 7,639,731 B1
(45) Date of Patent: Dec. 29, 2009

(54) CARRIER FREQUENCY ESTIMATION VIA SYMBOL RATE ESTIMATION

(75) Inventors: Carlos J. Chavez, Marion, IA (US); Robert J. Frank, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 582 days.

(21) Appl. No.: 11/416,620

(22) Filed: May 3, 2006

(51) Int. Cl.
*H04B 1/00* (2006.01)

(52) U.S. Cl. ............... 375/144; 375/140; 375/147; 375/148; 375/149; 375/316; 370/203; 370/320; 370/335

(58) Field of Classification Search ......... 375/135–137, 375/146–147, 150, 152, 243, 130, 131, 144, 375/148, 254, 296, 343, 346, 295, 316, 149; 370/203, 320, 335, 347
See application file for complete search history.

(56) References Cited

U.S. PATENT DOCUMENTS

| 6,661,834 B1* | 12/2003 | Shan et al. ............... 375/147 |
| 7,133,440 B1* | 11/2006 | Horne et al. ............. 375/150 |
| 7,151,790 B1* | 12/2006 | Patenaude et al. ........ 375/132 |
| 7,496,080 B1* | 2/2009 | Mower et al. ............. 370/347 |
| 2002/0154681 A1* | 10/2002 | Kontola .................... 375/147 |
| 2003/0231704 A1* | 12/2003 | Tanaka et al. ............. 375/150 |
| 2005/0254560 A1* | 11/2005 | Huang ...................... 375/150 |
| 2006/0103573 A1* | 5/2006 | Geier et al. ............ 342/357.02 |
| 2007/0183485 A1* | 8/2007 | Leimer ...................... 375/148 |
| 2008/0008082 A1* | 1/2008 | Ma et al. .................. 370/203 |

OTHER PUBLICATIONS

Wavelets and Wideband Correlation Processing; Lora G. Weiss; IEEE Signal Processing Magazine; Jan. 1994; p. 13-32.

* cited by examiner

*Primary Examiner*—Shuwang Liu
*Assistant Examiner*—Hirdepal Singh
(74) *Attorney, Agent, or Firm*—Matthew J. Evans; Daniel M. Barbieri

(57) ABSTRACT

A receiver for carrier frequency estimation via symbol rate estimation in the presence of carrier frequency error for use in signal acquisition and signal demodulation of spread-spectrum chips affected by Doppler shift in an advanced tactical data link. Received LPD signals with a very low signal-to-noise ratio are input to a receiver designed to tolerate carrier frequency error caused by Doppler shift. Extremely low signal-to-noise ratio and short dwell times due to spread spectrum modulation and frequency-hopping make direct estimation of carrier frequency impractical. A method and apparatus is disclosed to use the error is symbol rate, the nominal carrier frequency, and the nominal transmitted symbol rate to estimate carrier frequency error. This enables longer coherent integration times and improves LPD receiver performance.

16 Claims, 1 Drawing Sheet

CARRIER FREQUENCY ESTIMATION VIA SYMBOL RATE ESTIMATION

CROSS-REFERENCE TO RELATED APPLICATIONS

This application is filed concurrently with commonly assigned U.S. patent application Ser. No. 11/416,619, entitled "Signal Acquisition with Efficient Doppler Search", listing as inventors Carlos J. Chavez, Gunter B. Frank, and Robert J. Frank, and U.S. patent application Ser. No. 11/416,621 entitled "Architecture for Signal Acquisition with Cyclic Range Search", listing as inventors Carlos J. Chavez, Gunter B. Frank, and Robert J. Frank.

BACKGROUND OF THE INVENTION

1. Field of Invention

The present invention relates generally to the field of command, control, communications, computer, intelligence surveillance, and reconnaissance (C4ISR) hardware and software systems and components, and in particular using spread-spectrum communications.

2. Description of Related Art

TTNT (Tactical Targeting Networking Technology) is an advanced tactical data link currently under development by Rockwell Collins Government Systems and the Advanced Technology Center. Modes supporting Low Probability of Detection (LPD) are a highly desirable addition to existing TTNT functionality. The primary challenge for an LPD receiver is to operate at extremely low signal-to-noise ratio (SNR), often well below negative 20 dB. Because an LPD system must operate at extremely low SNR, the known sequence of chips used for signal acquisition must be very long (on the order of 1 million chips) in order to produce reasonable probabilities of detection and false alarm.

In addition, LPD performance is enhanced by frequency-hopping, which limits the amount of time an LPD signal dwells on any single carrier frequency.

Critical to LPD operation is the capability of a receiver to tolerate carrier frequency error caused by Doppler shift. Extremely low SNR and short dwell times make direct estimation of carrier frequency impractical. The present invention presents a method and apparatus whereby carrier frequency error can be estimated indirectly via estimation of the error in symbol rate. This enables longer coherent integration times and thus improves LPD receiver performance.

The majority of carrier frequency error observed by an LPD receiver in a tactical environment is a result of Doppler frequency shift. The error fe in carrier frequency caused by Doppler is a function of relative velocity v, nominal (transmitted) carrier frequency fc, and the speed of light c.

fe=±vfc/c

The same holds for the error Re in symbol rate caused by Doppler, where Rs is the nominal (transmitted) symbol rate.

Re=±vRs/c

It can be shown from the preceding expressions that the error fe in carrier frequency caused by Doppler can be expressed as a function of the error Re in symbol rate caused by Doppler.

{EQUATION 1}

$$fe = Re * fc/Rs \quad (EQ. 1)$$

Thus, if the error in symbol rate can be estimated, an estimate of the error in carrier frequency may be easily computed by multiplying the symbol rate error estimate by the ratio of nominal carrier frequency to nominal symbol rate.

Because LPD systems operate at extremely low SNR, transmission lengths are often extremely long. Error in the symbol rate caused by Doppler can result in a significant shift in symbol timing over the length of a message, which complicates signal acquisition.

In the present invention, certain terms are used as appreciated by a skilled artisan. Thus "chip" is often defined as "channel bit". A spread spectrum system, such as used by the present invention, achieves its spectral spreading using one or more techniques such as direct sequence, forward error correction, and orthogonal channel coding. Regardless of the technique used, the bits produced by the spreading are often referred to as "chips". These chips are modulated and sent over the channel. This distinguishes the bits created by the spreading technique ("chips") from the information bits going into the spreading technique ("bits"). Note that spread spectrum chips are not required to be binary. "Chip rate" is the rate or frequency at which the chips are transmitted. In a spread spectrum system, the chip rate is much faster than the information bit rate, thus the spectral spreading. "Chip time" is the reciprocal of the chip rate, or the duration in time of a single chip. "Multiple chip times" refers to a period of time that is equal to more than one chip time. A "known sequence" is a sequence of chips (or bits, or symbols) of which an authorized receiver has prior knowledge. The known sequence is typically sent at the beginning of a transmission. The receiver performs a search for the known sequence in order to detect the presence of a desired signal and synchronize its signal processing to it. The process of detecting the presence of a desired signal is often referred to as the signal "acquisition". Signal acquisition precedes signal demodulation.

SUMMARY OF THE INVENTION

Accordingly, an aspect of the present invention is concerned with carrier frequency estimation via symbol rate estimation, at the receiver side of a spread spectrum TTNT tactical data link.

The present invention works to first estimate carrier frequency via symbol rate estimation in a LPD spread-spectrum signal in a TTNT tactical data link, then to track the carrier frequency via symbol time tracking.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1:
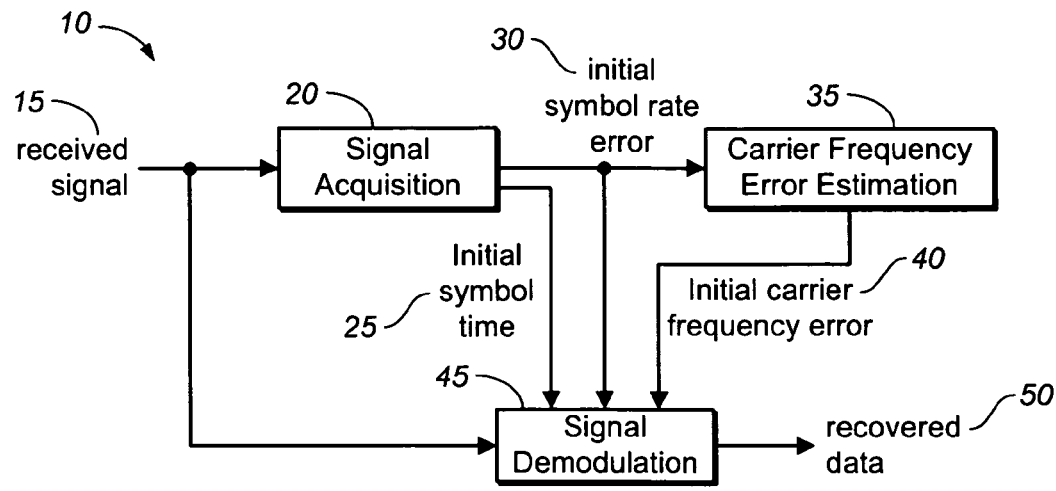
FIG. 1 is a block diagram for the initial estimation of carrier frequency via symbol rate estimation.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

The method and apparatus of the present invention may be hardware—such as a spread-spectrum receiver—that is, a circuit hardwire programmed to perform the signal acquisition functions outlined herein (e.g., an ASIC), hardware running firmware, or hardware running software, with the software existing in memory, and which may be written in any computer language (such as C, C++, Perl, Java or the like), and further, and/or in the alternative, the software may be run by a computer system having an operating system. The computer system typically has one or more processors, primary and secondary memory cooperating with the processor(s), which executes instructions stored in the memory, I/O means such as monitor, mouse and keyboard, and any necessary specialized hardware or firmware. Depending on the language used to construct and implement the software, the source code, object code and/or executables of the software may have any number of classes, functions, objects, variables, templates, lines of code, portions of code and constructs (collectively and generally, "a process step", "step", "block", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process step of the present invention, intermediate values, variables and data may be stored for later use by the program. In addition, the binary executable or source code data comprising the software of the present invention may reside on computer readable storage medium (e.g., a magnetic disk, which may be portable); memory (e.g., flash RAM); DVD or CD-ROM.

Turning attention to FIG. 1, there is shown a block diagram schematic of the method and apparatus of the present invention, for the initial estimation of carrier frequency via symbol rate estimation. The signal acquisition function of a LPD receiver must first estimate the carrier frequency before it can be tracked. This enables subsequent demodulation and recovery of the information contained within the signal.

Thus FIG. 1 depicts initial estimation of carrier frequency via symbol rate estimation. In a typical receiver, signal acquisition must occur before signal demodulation can take place. The signal acquisition function must detect the presence of a desired signal and determine an estimate of the initial symbol timing. If the symbol rate error caused by Doppler shift is significant, as can be the case for an LPD system, the signal acquisition function must also determine an estimate of the initial symbol rate error. Once a desired signal is detected, the signal demodulation function uses the initial symbol time and initial symbol rate error estimates to synchronously recover the data encoded in the received signal.

With the addition of the carrier frequency error estimation block shown in FIG. 1, an LPD receiver can apply the technique described herein. The carrier frequency error estimation block accepts the initial symbol rate error estimate and multiplies it by the ratio between the carrier frequency and the symbol rate, which are also known inputs, as outlined in connection with equation EQ. 1 above.

The resulting output is an estimate of the initial carrier frequency error. The signal demodulation function can compensate for this carrier frequency error and thus extend the length of time over which coherent integration of the desired signal can be performed. Longer coherent integration times enable better communication system performance.

Thus, turning attention to FIG. 1, showing the initial carrier frequency estimation circuit 10, a received signal 15 is received by the circuit comprising Signal Acquisition block 20, which can be any conventional spread-spectrum signal acquisition block that produces an initial symbol time and initial symbol rate error signal, or, equivalently, the signal acquisition block may be done by the method and apparatus as taught by U.S. patent application Ser. No. 11/416,619, entitled "Signal Acquisition with Efficient Doppler Search", listing as inventors Carlos J. Chavez, Gunter B. Frank, and Robert J. Frank, incorporated by reference herein. The Signal Acquisition block 20 outputs the initial signal timing, output initial symbol time 25 which is an estimate. There are well known methods in the art for estimating symbol timing. The specific implementation is not important to the present invention.

In FIG. 1, the Carrier Frequency Error Estimation block 35 accepts as input the initial symbol rate error 30 as output from the Signal Acquisition block 20, and, using equation EQ. 1 above, multiples the initial symbol rate error estimate by the ratio between the carrier frequency (nominal, transmitted) and the symbol rate (nominal, transmitted). Both the nominal, transmitted carrier frequency and symbol rate are known to the receiver. The Carrier Frequency Error Estimation block 35 then outputs an initial carrier frequency error signal 40. A signal demodulation function, provided by Signal Demodulation block 45, as is known per se, can compensate for the carrier frequency using the carrier frequency error and thus extend the length of time over which coherent integration of the desired signal can be performed, and outputs the recovered data information, as recovered data signal 50. Coherent integration and signal demodulation is known per se in the art.

Note that the signal demodulation block may use the initial estimates of symbol time, symbol rate error, and carrier frequency error to initialize a tracking loop, such as that described in connection with FIG. 2. Alternately, signal demodulation may be performed in an open loop manner without further estimation or tracking of symbol timing or carrier frequency. Carrier frequency tracking is not necessarily required by the present invention; an open loop implementation simply assumes that the initial carrier frequency estimate is of sufficient accuracy and that the carrier frequency will not change significantly over the length of the signal.

Figure 2:
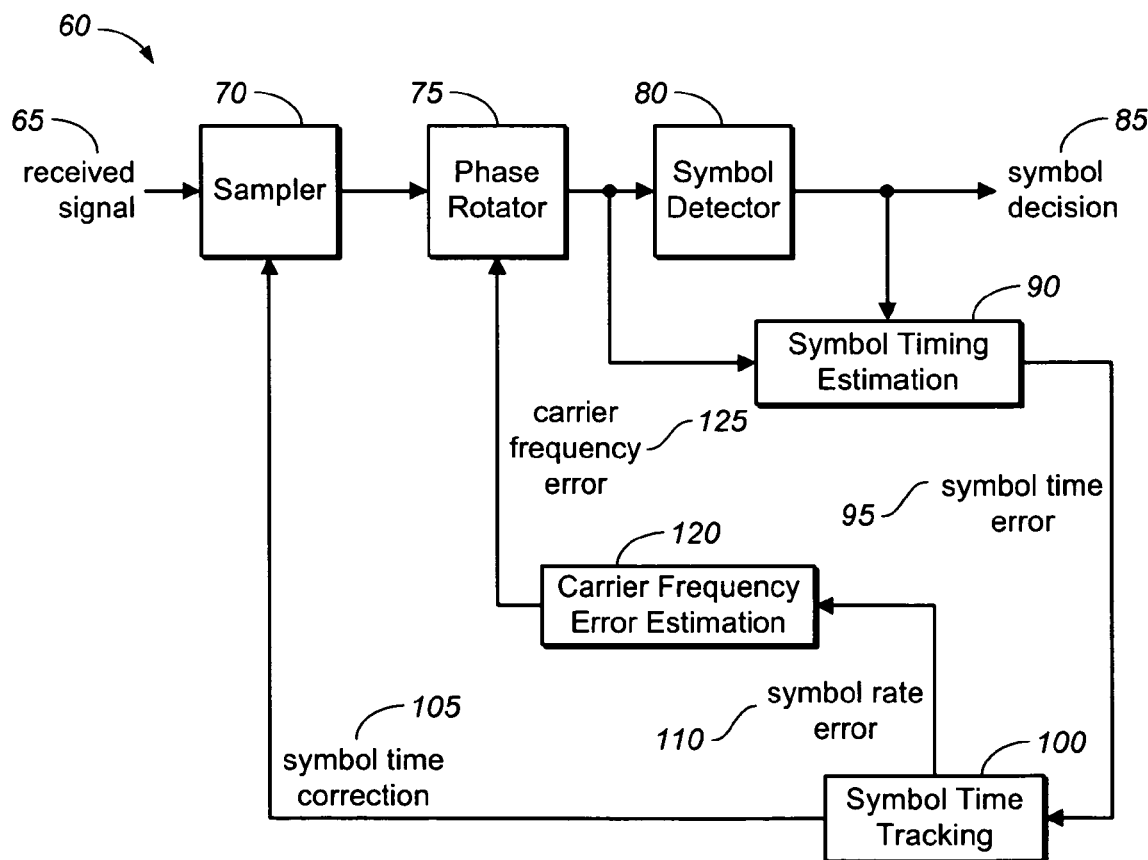
FIG. 2 is a block diagram for the tracking of carrier frequency via symbol time tracking.

If, however, it is desired to track carrier frequency, the circuit of FIG. 2 may be employed. FIG. 2 depicts the tracking of carrier frequency via symbol time tracking loop circuit 60. A representative symbol time tracking loop functions performs feedback as follows, but suitable modifications can be made by one of ordinary skill in the art using the teachings herein without departing from the scope of the invention.

The received signal 65 is sampled by the sampling block, Sampler block 70. Generally, the actual sample timing will be in error from the ideal sample timing. The Symbol Detector block 80 accepts the sampled signal from the Sampler block 70, and as output by a Phase Rotator 75, which receives a carrier frequency error signal, as explained further below, and removes carrier frequency error. The Symbol Detector block 80 makes a decision as to which symbol was sent by the transmitter and received, as output signal symbol decision 85. The Symbol Timing Estimation block 90 accepts the sampled signal, as output from the Phase Rotator block 75, which removes carrier frequency error, and optionally the Symbol Timing Estimation block 90 may accept the output signal symbol decision 85. "Symbol Timing" in refers to both symbol time (the best time to sample a particular symbol) and symbol rate, which have error signals produced downstream, at the output, of the Symbol Timing Estimation block 90. From these inputs, any number of well established decision-directed or non-decision directed techniques, known per se in the art, can be used to estimate the error in symbol time, output by the Symbol Timing Estimation block 90 as signal symbol time error 95 in FIG. 2. The symbol time error signal 95 drives the Symbol Time Tracking block 100, which produces symbol time corrections to be made by the sampler, Sampler block 70, as shown with output signal symbol time correction 105 in FIG. 2. The Symbol Time Tracking block 100 typically consists of a classical control feedback loop filter, known per se in the art. Thus, the error in symbol time may be tracked to zero by the symbol time tracking loop circuit 60.

If the symbol rate error caused by Doppler shift is significant, as can be the case for an LPD system, the symbol time tracking block must be capable of tracking the symbol rate error as well as the symbol time error. An estimate of the symbol rate error is a natural byproduct of a such Symbol Time Tracking block 100, and output as symbol rate error signal 110, as shown in FIG. 2.

Thus with the addition of the Carrier Frequency Error Estimation block 120 shown in FIG. 2, an LPD receiver can apply the technique described previously, in connection with equation EQ. 1. The Carrier Frequency Error Estimation block 120 accepts the symbol rate error estimate signal 110 and multiplies it by the ratio between the carrier frequency and the symbol rate, as taught by EQ. 1. The resulting output, signal carrier frequency error 125, is an estimate of the carrier frequency error. The Phase Rotator block 75, as shown in FIG. 2, may be used to remove the carrier frequency error by multiplying the received signal of carrier frequency error 125 output by the Carrier Frequency Error Estimation block 120 by a rotating complex phasor. Thus, the error in carrier frequency may be tracked to zero via symbol time tracking and the application of feedback to the sampled received signal 65. This extends the length of time over which coherent integration of the desired signal can be performed. Longer coherent integration times enable better communication system performance.

Although the present invention has been described in terms of the preferred embodiments above, numerous modifications and/or additions to the above-described preferred embodiments would be readily apparent to one skilled in the art.

It is intended that the scope of the present invention extends to all such modifications and/or additions and that the scope of the present invention is limited solely by the claims set forth below.

We claim:

1. A system for carrier frequency estimation for a spread-spectrum signal receiver via symbol rate estimation in presence of carrier frequency error caused by Doppler shift comprising:
a signal acquisition block for acquiring a transmitted spread-spectrum signal,
said signal acquisition block having a signal acquisition function to detect presence of the spread-spectrum signal, said signal acquisition block determining an estimate of a symbol rate error caused by Doppler shift;
a carrier frequency error estimation block for determining an initial carrier frequency error, said carrier frequency error estimation block accepting as input the symbol rate error estimate from said signal acquisition block,
wherein the system for carrier frequency estimation uses the symbol rate error to determine carrier frequency error, the transmitted spread-spectrum signal having a known nominal carrier frequency and a known nominal symbol rate, and wherein
said carrier frequency error estimation block multiplying said symbol rate error estimate by a ratio between the nominal carrier frequency of the transmitted spread-spectrum signal and the nominal symbol rate of the transmitted spread-spectrum signal to determine the initial carrier frequency error, and outputting the initial carrier frequency error as an initial carrier frequency error signal.

2. The invention according to claim 1, further comprising:
a signal demodulator;
said signal acquisition block having means to estimate the initial symbol timing of said spread-spectrum signal and wherein
said signal demodulator employing coherent integration and demodulating the spread-spectrum signal, said signal demodulator receiving as input the initial carrier frequency error signal.

3. The invention of claim 2, wherein:
said signal demodulator performs signal demodulation using said initial carrier frequency error signal in an open loop implementation.

4. The invention of claim 2, wherein:
said initial estimates of symbol time, symbol rate error, and initial carrier frequency error are used to initialize a tracking loop, said tracking loop to track carrier frequency of said spread-spectrum signal.

5. A system for carrier frequency estimation for a spread-spectrum signal receiver comprising:
a circuit receiving a transmitted spread-spectrum signal, the transmitted spread-spectrum signal having a known nominal carrier frequency and a known nominal symbol rate, said circuit having means for determining an estimate of a symbol rate error of the spread-spectrum signal caused by Doppler shift and outputting said symbol rate error;
a carrier frequency error estimation block for determining a carrier frequency error of the transmitted spread-spectrum signal, said carrier frequency error estimation block accepting as input the symbol rate error of said circuit, wherein
said carrier frequency error estimation block multiplying said symbol rate error estimate by a ratio between the nominal carrier frequency of the transmitted spread-spectrum signal and the nominal symbol rate of the transmitted spread-spectrum signal to determine the carrier frequency error, and outputting the carrier frequency error as a carrier frequency error signal.

6. The invention according to claim 5, further comprising:
a tracking loop for tracking symbol timing with a symbol time correction signal and carrier frequency with a carrier frequency error signal for the spread-spectrum signal, said tracking loop comprising a sampler for sampling a received signal, a symbol detector for making a decision as to the symbol received in the spread-spectrum signal, and said carrier frequency error estimation block, wherein said tracking loop tracking said carrier frequency error and applying said carrier frequency error in feedback in said tracking loop; and, the output of said carrier frequency error estimation block leading to the input of said symbol detector.

7. The invention according to claim 6, further comprising:

a phase rotator receiving the output of said carrier frequency error estimation block as input, and the input of said phase rotator leading to the input of said symbol detector.

8. The invention according to claim 7, wherein:

said Symbol Time Tracking block comprises a control feedback loop filter, and outputs said symbol rate error signal as input to said carrier frequency error estimation block.

9. The invention according to claim 6, further comprising:

a Symbol Timing Estimation block accepting the sampled spread-spectrum signal from said sampler, and estimates the error in symbol time in said spread-spectrum signal;

means for removing carrier frequency, receiving the output of said carrier frequency error estimation block as input, and the input of said means for removing carrier frequency error leading to the input of said Symbol Timing Estimation block; and, said Symbol Timing Estimation block outputting the symbol time error signal.

10. The invention according to claim 9, further comprising:

a Symbol Time Tracking block receiving as input said symbol time error signal, said Symbol Time Tracking block produces as output a symbol time correction signal as input for said sampler.

11. A method of carrier frequency estimation of a spread-spectrum signal by symbol rate estimation in presence of carrier frequency error caused by Doppler shift comprising the steps of:

receiving a transmitted spread-spectrum signal;

estimating a symbol rate error of the spread-spectrum signal caused by Doppler shift;

determining a carrier frequency error of the spread-spectrum signal from the symbol rate error;

ascertaining a nominal carrier frequency and a nominal symbol rate of the spread-spectrum signal;

multiplying the symbol rate error estimate by a ratio between the nominal carrier frequency of the transmitted spread-spectrum signal and the nominal symbol rate of the transmitted spread-spectrum signal to determine the carrier frequency error, the carrier frequency error represented by a carrier frequency error signal.

12. The method according to claim 11, further comprising the steps of:

sampling the received spread-spectrum signal;

removing the carrier frequency error from the sampled spread-spectrum signal using the carrier frequency error signal;

estimating the error in symbol time from the sampled spread-spectrum signal after removal of the carrier frequency error from the sampled spread-spectrum signal, the estimation of symbol time error made by a symbol time estimation block receiving the sampled spread-spectrum signal after removal of the carrier frequency error, and the symbol time estimation block outputting a symbol time error signal.

13. The method according to claim 12, further comprising the steps of:

detecting symbols in the sampled spread-spectrum signal with a symbol detector, the symbol detector making a decision as to whether a symbol was detected and outputting a symbol decision.

14. The method according to claim 12, further comprising the steps of:

providing feedback to the sampling of the received signal through a symbol time correction signal, the signal time correction signal produced by a symbol time tracking block that receives as input the symbol time error signal.

15. The method according to claim 14, further comprising the steps of:

removing the carrier frequency error from the sampled spread-spectrum signal using the carrier frequency error by way of a Phase Rotator.

16. The method according to claim 12, further comprising the steps of:

demodulating said spread-spectrum signal using a tracking loop, the tracking loop employing the estimates of symbol time, symbol rate error, and initial carrier frequency error.

* * * * *